(12) United States Patent
Gilderman et al.

(10) Patent No.: US 10,984,017 B1
(45) Date of Patent: Apr. 20, 2021

(54) MULTI-TIERED DATA REPLICATION

(71) Applicant: Amazon Technologies, Inc., Seattle, WA (US)

(72) Inventors: Ilia Gilderman, Bellevue, WA (US); Edward Paul Murray, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 274 days.

(21) Appl. No.: 15/822,407

(22) Filed: Nov. 27, 2017

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC ...... G06F 16/27; G06F 3/0604; G06F 11/202; G06F 11/2056; G06F 16/2471; G06F 3/0634
See application file for complete search history.

(56) References Cited

U.S. PATENT DOCUMENTS

| | | | | |
|---|---|---|---|---|
| 2013/0031114 A1* | 1/2013 | Kobayashi | ............ | G06F 16/986 707/755 |
| 2014/0181022 A1* | 6/2014 | Ngo | ........................ | G06F 16/27 707/624 |
| 2015/0278329 A1* | 10/2015 | Hrle | ........................ | G06F 16/27 707/615 |

* cited by examiner

*Primary Examiner* — Truong V Vo
(74) *Attorney, Agent, or Firm* — Lowenstein Sandler LLP

(57) ABSTRACT

Described herein is technology for replicating data from a source database to one or more target databases at different points in time. The system receives a request to replicate a data set stored in a source database. The system stores a copy of a first subset of the data set from the source database to a target database at a first time. The system stores a copy of a second subset of the data set from the source database to the target database at a second time.

17 Claims, 6 Drawing Sheets

MULTI-TIERED DATA REPLICATION

BACKGROUND

Database replication services can be used for copying data from a source database to a target database. For example, the database replication service may connect to the source database, read the source data, copy the source data, and load the target data into the target database to replicate the data.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
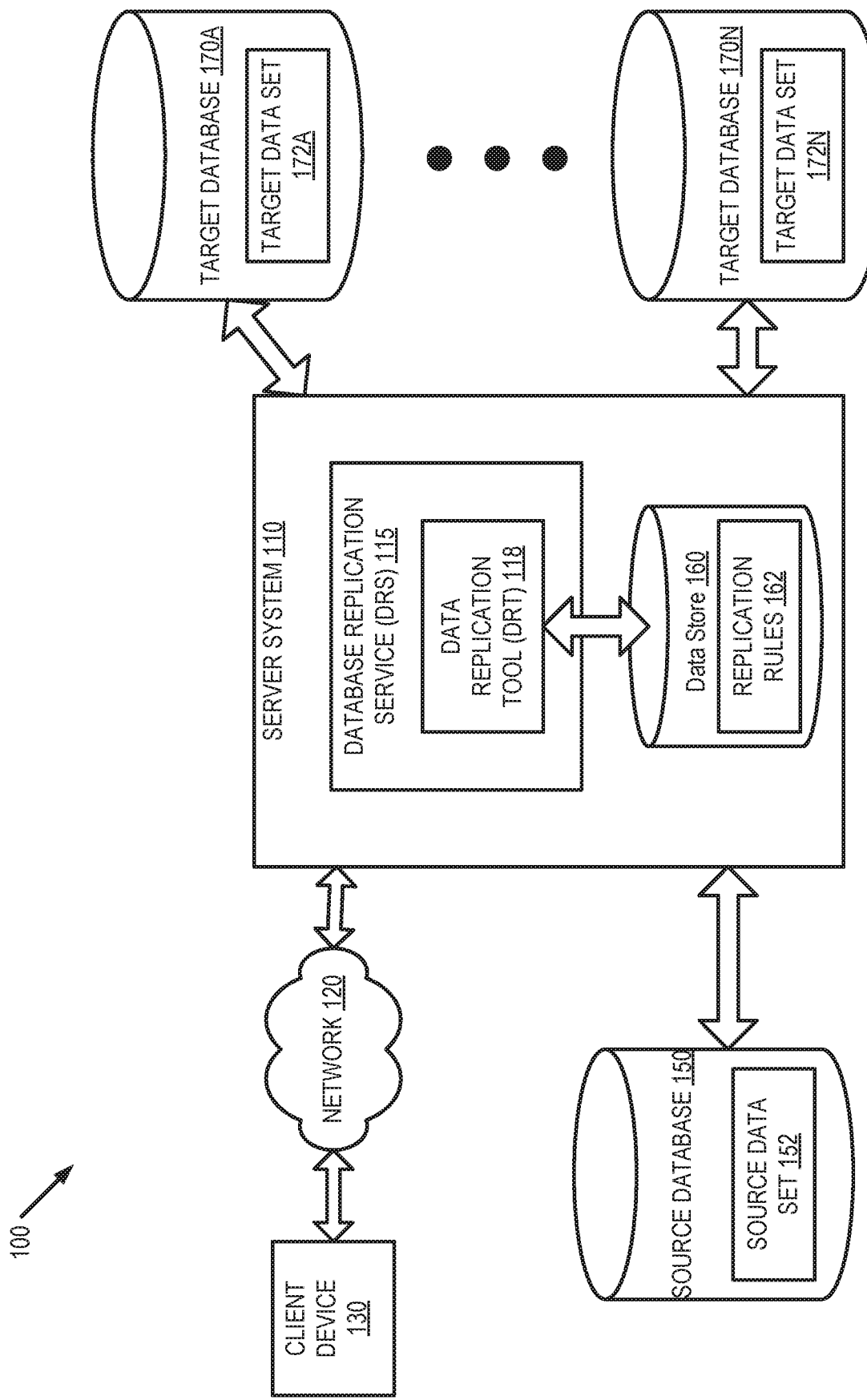
FIG. 1 is a block diagram of an example network architecture in which embodiments of a data replication tool may operate, according to one embodiment.

Embodiments described herein relate to multi-tiered data replication from a source database to one or more target databases. In multi-tiered replication some of the data (i.e., from a first tier) is held to be consistent on write and some of the data (i.e., from a second tier) will be eventually consistent. Users of the multi-tiered replication techniques described herein may be able to specify a collection of objects for which data, when replicated, should obey transaction boundaries. Additionally the users may have the ability to identify members (i.e., objects) of the same replica set which are allowed to be "eventually consistent." In one embodiment, for example, a source table, database or other data structure, may contain various data types, including large object (LOB) data elements. A user may be allowed to define a replica set in such a way that the non-LOB data elements from the source are written to a target as a transaction, and thus made immediately consistent, while the LOB data objects are replicated at a possibly later point in time, thereby bringing the entire dataset into complete consistency eventually.

Conventional data replication services do not include mechanisms to replicate subsets of data sets to one or more target databases at different points in time. In general, these conventional data replication services require the entire data set to be replicated and committed to the target in a single transaction at the same time. However, the size or importance of certain data objects in the data set, along with the availability of processing and network resources, may make it advantageous to split the data set into subsets that are replicated at potentially different points in time.

In one embodiment, a data replication tool can receive a request to replicate a data set stored in a source database. The data replication tool can store a copy of a first subset of the data set from the source database to a target database at a first time. The first subset may include certain data objects or types of data assigned by default, or defined in user-specified rules, to be made immediately consistent. The data replication tool can then store a copy of a second subset of the data set from the source database to the target database at a later time. The second subset may include other data objects or types of data assigned by default, or defined in the user-specified rules, to be made eventually consistent.

The embodiments described herein set forth a data replication process in which the subsets of data sets may be copied to one or more target databases at different points in time. Instead of merely replicating an entire data set in a source database in a single transaction or at the same time, elements of a data set can be copied to one or more target databases at potentially different points in time. These elements of the data set may be of the same data type or of a different data type. For example, the first subset can be a first element of a data item and the second subset can be a second element of the data item, the first and second elements being different elements of the data item. Alternatively, the first subset can be one or more elements and the second subset can be one or more elements, where one or more of the elements are common in the first and second subsets. The one or more target databases may also have different schemas or be designed to store different file types.

In one embodiment, a reference key may be generated that identifies a location of a data subset. The reference key is stored in conjunction with an element of the data set and identifies a location of a copy of the element at the target database. In one embodiment, the reference key is stored at the target database. In one embodiment, the reference key is stored at the source database. The reference may be a logical address of a data set.

Depending on the embodiment, replication of data may be done asynchronously or synchronously. Data can be copied and stored asynchronously according to user settings. User settings may include time of data replication, data type of data replication, destination of data replication, database resource availability, and various limitations on the type of data to be stored. In one embodiment, data is copied and stored asynchronously according to database availability, memory resource availability, or processor resource availability. Rules controlling the replication of data are stored in a data store on a server system.

In one embodiment, the data replication tool described herein may be integrated into a data migration service (DMS) or may be a standalone software product or feature that is used in connection with replication being performed by a data migration service. Additional details of multi-tiered data replication are provided below with respect to FIG. 1-6.

FIG. 1 is a block diagram of an example network architecture 100 in which embodiments of a data replication tool (DRT) 118 may operate. The network architecture 100 may include a server system 110 and a client device 130 capable of communicating with server system 110 via a network 120. Network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, network 120 may have any suitable communication range associated therewith and may include, for example, public networks (e.g., the Internet), metropolitan area networks (MANs), wide area networks (WANs), local area networks (LANs), or personal area networks (PANs). In addition, network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Client device 130 may include any type of mobile computing device (e.g., that has a finite power source) or traditionally non-portable computing device. Client device 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. Client device 130 may also be a traditionally non-portable computing device such as a desktop computer, a server computer, or the like. Client device 130 may be configured with functionality to enable execution of an application to interact with a database replication service (DRS) 115, data replication tool (DRT) 118, or both.

Communication between the server system 110 and the client device 130 may be enabled via any communication infrastructure, such as public and private networks. One example of such an infrastructure includes a combination of a WAN and wireless infrastructure, which allows a user to use client device 130 to interact with database replication service 115, data replication tool 118, or both without being tethered to the server system 110 via hardwired links. The wireless infrastructure may be provided by one or multiple wireless communications systems. One of the wireless communication systems may be a wireless local area network (WLAN) access point connected with the network 120. Another of the wireless communication systems may be a wireless carrier system that can be implemented using various data processing equipment, communication towers, etc. Alternatively, or in addition, the wireless carrier system may rely on satellite technology to exchange information with the client device 130.

Server system 110 may be set up by an entity such as a company or a public sector organization to provide one or more services (such as various types of cloud-based computing or storage) accessible via the Internet and/or other networks to client device 130. Server system 110 may include numerous data centers hosting various resource pools, such as collections of physical and/or virtualized computer servers, storage devices, networking equipment and the like, needed to implement and distribute the infrastructure and services offered by the server system 110, including to provide multi-tenant and single-tenant services. In some embodiments, server system 110 may implement the database replication service 115, data replication tool 118, or both, and associated services, provide other computing resources or services, such as a virtual compute service and storage services, such as object storage services, block-based storage services, data warehouse storage service, archive storage service, source database 150, target databases 170A-170N, and/or any other type of network based services (which may include various other types of storage, processing, analysis, communication, event handling, visualization, and security services, such as a code execution service that executes code without client management of the execution resources and environment). Client device 130 may access these various services offered by server system 110 via network 120, for example through an application programing interface (API) or a command line interface (CLI). Likewise network-based services may themselves communicate and/or make use of one another to provide different services.

Server system 110 may include the database replication service (DRS) 115 that has access to source database 150 that stores source data set 152 and to one or more target databases 170A-170N, where A-N represents two or more target databases. In one embodiment, the DRS 115 connects to the source database 150, reads the source data set 152, and replicates the source data set to be stored in the one or more target databases 170A-170N. The source database 150 and one or more target databases 170A-170N may be implemented in multiple data repositories, including one or more storage devices. The source database 150 and the one or more target databases 170A-170N can be homogeneous databases or heterogeneous databases. The one or more target databases 170A-170N can be heterogeneous or homogenous with respect to one another and with respect to source database 150. The source database 150 and the one or more target databases 170A-170N can be large relational databases that include multiple tables. The DRS 115 can format (or reformat) the data from the source data set 152 for replication to the one or more target databases 170A-170N before loading the data in the one or more target databases 170A-170N as the one or more target data sets 172A-172N.

Server system 110 may also include the DRT 118 that replicates data from the source database 150 and stores the data to the one or more target databases 170A-170N. In one embodiment, the DRT 118 may be integrated as part of the DRS 115. In another embodiment, the DRT 118 is a separate product or feature from the DRS 115. The DRT 118 can replicate data while the data is subject to change because of continued use of the source database 150. The DRT 118 can store the replicated data at a later time than the actual replication of the data. The DRT 118 can record a location of the copy of the replicated data. The DRT 118 can store the location of the replicated data at the source database 150 or at the one or more target databases 170A-170N. The DRT 118 can replicate data according to the limitations or instructions provided by the replication rules 162 in data store 160. The replication rules 162 may include a user setting, software setting, or hardware setting. User settings may include time of data replication, data type of data replication, destination of data replication, selecting a database based upon database resource availability, and various limitations on the type of data to be stored. In one embodiment, hardware and software settings may include database availability, memory resource availability, or processor resource availability. In one embodiment, replication rules 162 specify what types of data are to be replicated immediately, and which types of data can be replicated eventually. In one embodiment, replication rules 162 include default settings that are set by the system developer, which may be based for example on the size of a data object. For example, a size threshold may be defined, such that any data objects having a size below the threshold can be replicated immediately upon request, while any data objects having a size above the threshold can be replicated eventually when resources allow. In one embodiment, the threshold may be configurable by a user or system administrator. In other embodiments, replication rules 162 can be user defined such as specifying particular data types that are to be replicated eventually regardless of size.

Figure 2:
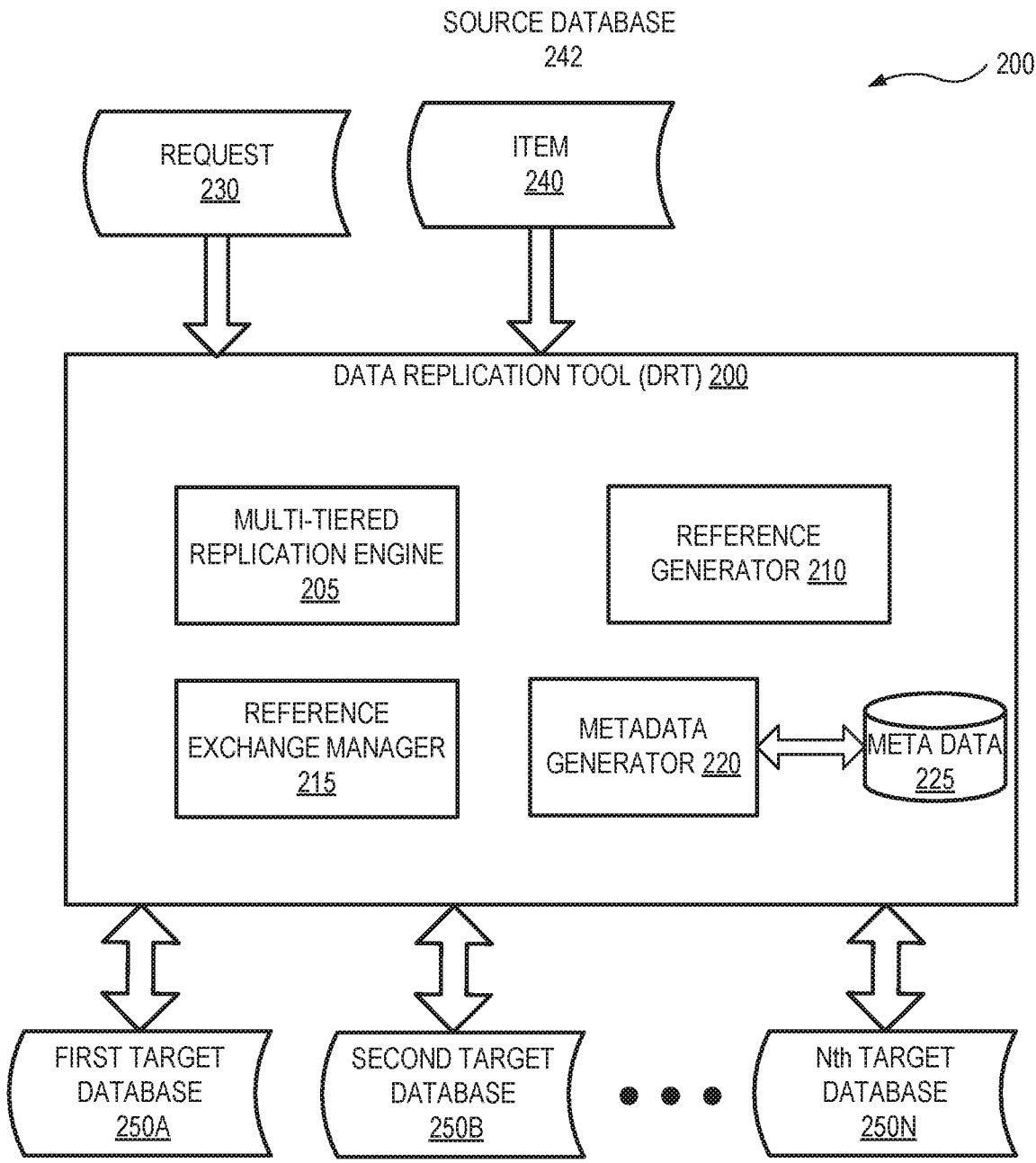
FIG. 2 is a block diagram of a logical view of a data replication tool (DRT), in accordance with one embodiment.

In one embodiment, the DRT 118 can generate and store a metadata table containing the locations of the replicated data, such as described and illustrated with respect to FIG. 2. The DRT 118 may store the metadata table at the source database 150, at the data store 160, or at the one or more target databases 170A-170N.

It should be noted that different customers may use DRS 115 to replicate data synchronously or asynchronously. For example, data replication occurs asynchronously or synchronously as controlled by the replication rules 162. DRT 118 is configurable by the replication rules 162 to allow a customer to select a time of data replication, a data type of data replication, a destination of data replication, a database based upon database resource availability, and various limitations on the type of data to be stored. In one embodiment, DRT 118 is configurable by the replication rules 162 based on database availability, memory resource availability, or processor resource availability to allow for asynchronous or synchronous replication and storage of data sets.

At a high level, the DRT 118, as described herein, 1) provides a mechanism to replicate data between a source database 150 and the one or more target databases 170A-170N at potentially different points in time; 2) provides a mechanism for generating a reference; and 3) provides a mechanism for exchanging references, and/or 4) provides a mechanism for generating metadata.

1) To perform data replication, the DRT 118 identifies a data item in the source database 150. DRT 118 identifies the databases within the one or more target databases 170A-170N where the subset of the data item is to be stored and stores the subset accordingly. 2) To generate a reference, the DRT identifies a location of the copy of the data subset of the data set to be stored at one of the one or more target databases 170A-170N. 3) To exchange a reference, the DRT 118 sends the reference to a different database within the one or more target databases 170A-170N to be stored in connection with a different subset of data of the data item. 4) To generate metadata, the DRT 118 compiles a table including at least one location of the replicated subset of the data set. Additional details of the DRT 118 are described below with respect to FIG. 2.

FIG. 2 is a block diagram of a logical view of a data replication tool (DRT) 200, in accordance with one embodiment. DRT 200 may correspond to the DRT 118 of FIG. 1. In some embodiments, DRT 200 may include a multi-tiered replication engine 205, a reference generator 210, a reference exchange manager 215, and a metadata generator 220. Collectively the components of the DRT 200 may provide a data replication mechanism that can be used in connection with database replication. The DRT 200 may be integrated into a data replication service or a data migration service or may be a standalone software product or feature that is used in connection with replication being performed by a data migration service. In general, the function of the DRT 200 is to replicate the contents of a data item (a single data item or a collection of items), in one data store (e.g., database) to one or more different data stores at different points in time. This replication will optionally allow for a key exchange whereby the key for the elements in one data store are passed to the other data store(s) and vice versa for reference. The replication will also optionally generate metadata that specifies the key exchange information.

In one embodiment, multi-tiered replication engine 205 can receive a request 230 from a DRS (e.g., DRS 115 of FIG. 1), a data migration service, a client device, or the like to replicate data from a source database to one or more target databases. In particular, the request 230 can specify a data item 240 stored at the source database 242, as well as the target database 250 where the data item or where elements of the data item are to be replicated. For example, in connection with replicating an item 240 from the source database 242 to the target database 250 in the DRS, the user or replication rules 162 can specify a first element of the data item and a second element of the data item to be replicated. The user or replication rules 162 may also control when the first and second element is stored.

In one embodiment, the multi-tiered replication engine 205 receives the request 230 and parses the request 230 to identify the item 240 stored at the source database 242 and the one or more target databases 250A-250N where the item 240 is to be copied in order to complete the replication of the data items 240 or data set. In one embodiment, the request 230 identifies a first target database 250A (and optionally a second target data base 250B) and the data item 240 includes multiple elements. In one embodiment, the multi-tiered replication engine 205 generates a copy of a first element of the data item 240 and sends the copy of the first element to the first target database 250A at a first time (e.g., as soon as possible after the request 230 is received and processed). The multi-tiered replication engine 205 generates a copy of a second element of the data item 240 and sends the copy of the second element to the first target database 250A (or second target database 250B) at a second time (e.g., after other "eventually consistent" elements from other requests have been replicated, or when processing and network resources become available). The multi-tiered replication engine 205 may generate and send additional copies to additional target databases identified in the request 230, such as to the Nth target database 250N, where N represents a target database that would be three or greater target databases. Additional details of the operations of the multi-tiered replication engine 205 are described herein with respect to FIGS. 3-6.

The DRT 200 may also provide key exchange whereby the key for the elements in one target database can be passed to the other database and vice versa for reference. In one embodiment, the DRT 200 includes a reference generator 210 and reference exchange manager 215 in order to generate and exchange keys in connection with the replication of the data item 240. In one embodiment, the reference generator 210 generates a first reference identifying a location of the copy of the first element to be stored at the first target database 250A and the reference exchange manager 215 sends the first reference to the second target database 250B to be stored in connection with the second element at the second target database 250B. In a further embodiment, the reference generator 210 generates a second reference identifying a location of the copy of the second element to be stored at the second target database 250B and the reference exchange manager 215 sends the second reference to the first target database 250A to be stored in connection with the first element at the first target database 250A. This way the first target database 250A includes a reference to copies of the other element that are not necessarily stored at the first target database 250A. Similarly, the second target database 250B includes a reference to copies of the other elements that are not necessarily stored at the second target database 250B. In some embodiments, the references generated by the reference generator 210 are stored at the source database 242, instead of or in addition to being stored at the respective target databases.

The DRT 200 can generate metadata outlining the key exchange information. In one embodiment, the DRT 200 includes a metadata generator 220 that generates metadata 225, such as a metadata table with the key exchange information. The key exchange information provides mappings where the data items have been replicated by the DRT 200. The metadata 225 can be stored in a data store at the DRT 200. Alternatively, the metadata 225 can be stored at the source database 242, at the one or more target databases 250A-250N, or any combination thereof. Additional details regarding the DRT 200 are described below with respect to some examples.

As a simple example, a source database 242 can store a data item in a three-table model. This data item is stored in a model where a user owns one or more folders, each folder containing 0 or more documents. The user can be described with an identifier (ID), such as a number, and a name that may be a varchar. The folder can be described with an ID (number), a user identifier (number), and a name (varchar). The documents can be described with an ID (Number), a folder identifier (number), and contents (character large object (CLOB), binary large object (BLOB), or other data types used by databases for large amounts of character data). For this case, the source database 242 may be a relational database and a user may select to replicate all the data to another relational database at a first time, except for the column document.contents, which is to be replicated to either the destination relational database or to a cloud storage service (e.g., Amazon Simple Storage Service (S3) cloud storage and referred to as S3 bucket) at a second time. Also, the DRT 200 can be used to pass a reference to the S3 bucket back to the relational database. In this case, the replication can be defined as follows:

Replica set: {Tables: [User: {immediately consistent}, Folder: {immediately consistent}, Document:{columns: [{id, immediately consistent}, {folder_id, immediately consistent}, {contents, eventually consistent}]}

This would indicate that DRT 200 is to transfer the data in such a way that the tables User, Folder, and columns Id and Folder_id from the table Document are to be replicated such that the data within them is immediately consistent upon write. The column contents from the table Document, however, can be updated later (i.e., eventually) to bring the data in the one or more target databases to complete consistency at that later point in time.

In one embodiment, the metadata generator 220 can generate metadata 225 in connection with the replication and key exchange. In one embodiment, the metadata generator 220 generates a metadata table comprising an indication of a task to cause multi-tiered replication engine 205 to replicate at least a portion of the data set at the second time. Metadata 225 may be structured in any number of different ways, such as using table format or as a queue. When functioning as a queue, metadata 225 may receive tasks from various replication requests, such as request 230, where each task corresponds to the replication of at least a portion of a data set that need not be immediately consistent, but rather can be made eventually consistent. When not otherwise engaged in replication activities, multi-tiered replication engine 205 can pull tasks from the queue and replicate the data elements as indicated by the task. Thus, the portions of the data set can be made eventually consistent at a time when all previously requested replication tasks have been completed and/or when there are available processing or network resources to allow the replication to be completed.

Building on the previous example, suppose that the documents contain images. Now the data item is stored in a model where a user owns one or more folders, each folder containing 0 or more documents that contain 0 or more images. The user can be described with an identifier (ID), such as a number, and a name that may be a varchar. The folder can be described with an ID (number), a user identifier (number), and a name (varchar). The documents can be described with an ID (Number), a folder identifier (number), and contents (character large object (CLOB), binary large object (BLOB), or other data types used by databases for large amounts of character data). The images can be described with an identifier (number), a document identifier (number), and the image (BLOB).

For this case, a request may indicate that the basic information: User, Folder and Document information (not including the document itself) is to be replicated in an immediately consistent fashion. Replication of the document itself can be eventually consistent, however, we also want to ensure that the images associated with the document are also present on the target system when the document is available on the target system. As such, the replica set can be defined as follows:

Replica set: {Tables: [User: {immediately consistent}, Folder: {immediately consistent}, Document: {columns: [{id, immediately consistent}, {folder_id, immediately consistent}, {contents, eventually consistent, replica subset: A}], Image:{columns: [{id, immediately consistent}, {document_id, immediately consistent}, {image, eventually consistent, replica subset: A}]}

This would indicate that DRT 200 is to replicate the tables User, Folder, and columns Id and Folder_id from the table Document are to be replicated in the same transaction, such that the data within them is immediately consistent upon write. The column contents from the table Document, however, and any corresponding images from the table Image can be updated later (i.e., eventually) to bring the data in the one or more target databases to complete consistency at that later point in time, as long as the column document.contents and any corresponding image data is committed in the same transaction at that later time.

As described herein, the exemplary embodiments set forth a data replication process in which the subsets of data sets may be copied to one or more target databases at different points in time. Instead of merely replicating an entire data item or data set in a source database at one time, elements of a data item can be copied in different transactions at potentially different points in time. These elements of the data item may be of the same data type or of a different data type. The target databases may have different schemas or be designed to store different file types.

In one embodiment, the data replication tool 200 receives a request 230 to replicate a data set stored in a source database 242. The data replication tool 200 stores a copy of a first subset of the data set from the source database at the first target database 250A at a first time. The data replication tool 200 stores a copy of a second subset of the data set from the source database at the first target database 250A or at a second target database 250B at a second time.

In one embodiment, the data replication tool 200 receives a request 230 to replicate a data item 240 stored in the source database 242, the request identifying one or more target databases 250, the data item 240 comprising multiple elements. The data replication tool 200 generates a copy of the first element of the data item 240. The copy of the first element is sent to the target database 250 at a first time. The data replication tool 200 generates a copy of the second element of the data item 240. The copy of the second element is sent to the target database 250 at a second time.

In one embodiment, reference generator 210 receives a notification that a data set has been replicated. The reference may be a logical address pointing to a physical location inside of a database. In one embodiment, a first reference is generated identifying location of the copy of the first subset of the data set to be stored at the first target database. A second reference is generated identifying a location of the copy of the second subset of the data set to be stored at the second target database.

Figure 3:
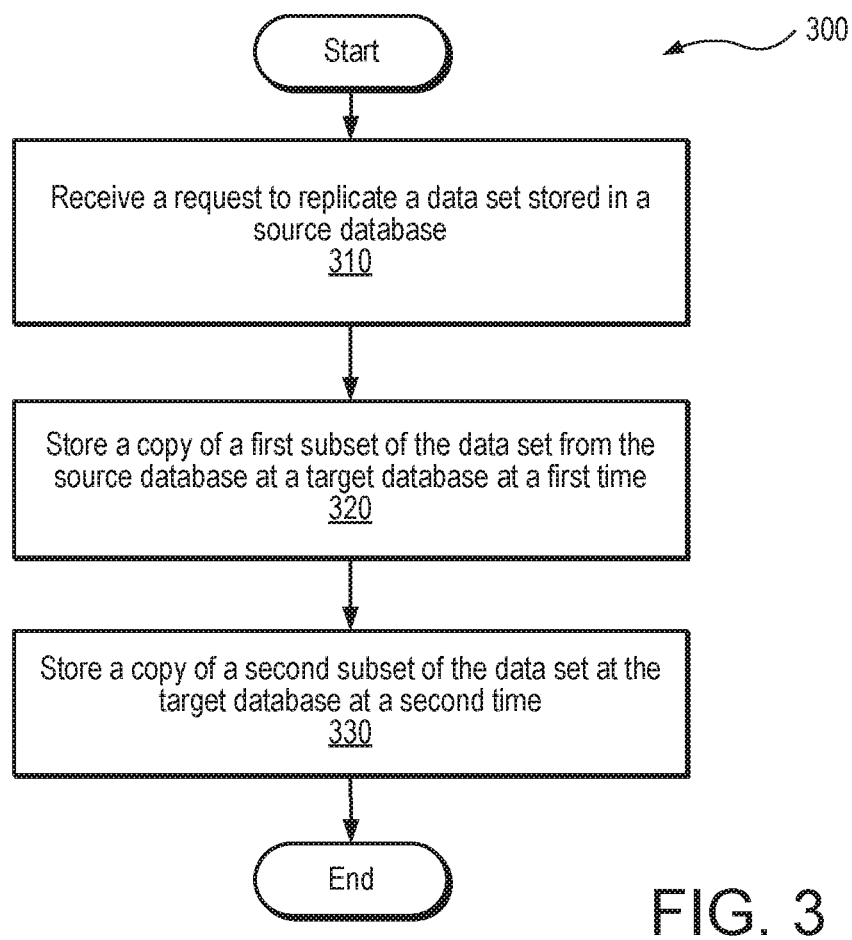
FIG. 3 illustrates a flowchart that provides an example of a process executed by a data replication tool, according to one embodiment.

FIG. 3 illustrates a flowchart that provides an example of a process 300 executed by a data replication tool, according to one embodiment. It is understood that the flowchart of FIG. 3 provides an example of the many different types of functional arrangements that may be employed to implement the operation of the data replication tool as described herein. Process 300 may be performed by a processing logic that may comprise hardware (e.g., circuitry, dedicated logic, programmable logic, microcode, etc.), software (e.g., instructions run on a processing device), or a combination thereof. In one embodiment, the data replication tool 118 of FIG. 1 executes the process 300 to replicate data from a source database to one or more target databases at different points in time. In another embodiment, the data replication tool 200 of FIG. 2 executes the process 300. In another embodiment, the DRS 115 of FIG. 1 executes the process 300. Alternatively, one or more components of the server system 110 execute some or all of the process 300.

Referring to FIG. 3, the processing logic begins the process 300 by receiving a request to replicate a data set stored in a source database (block 310). The processing logic stores a copy of a first subset of the data set from the source database at a target database at a first time (block 320). The processing logic stores a copy of a second subset of the data set from the source database at the target database at a second time (block 330), and the process 300 ends.

In a further embodiment, the copy of the first subset of the data set is a first data type and the copy of the second subset of the data set is a second data type. In another embodiment, the copy of the first subset of the data set includes a same data subset, and the copy of the second subset of the data set includes the same data subset.

In a further embodiment, the processing logic generates a first reference identifying a location of the copy of the first subset of the data set to be stored at the first target database. The processing logic sends the first reference to the second target database to be stored in connection with the second subset of the data set at the second target database. In a further embodiment, the processing logic generates a second reference identifying a location of the copy of the second subset of the data set to be stored at the second target database. The processing logic sends the second reference to the first target database to be stored in connection with the first subset of the data set at the first target database. In one embodiment, the first reference includes a logical address located on at least one of the source database, the first target database, or the second target database.

In another embodiment, the processing logic generates a reference table including at least the location of the copy of the first subset of the data set to be stored at the first target database. In one embodiment, the first target database has a first schema and the second target database has a second schema.

Figure 4:
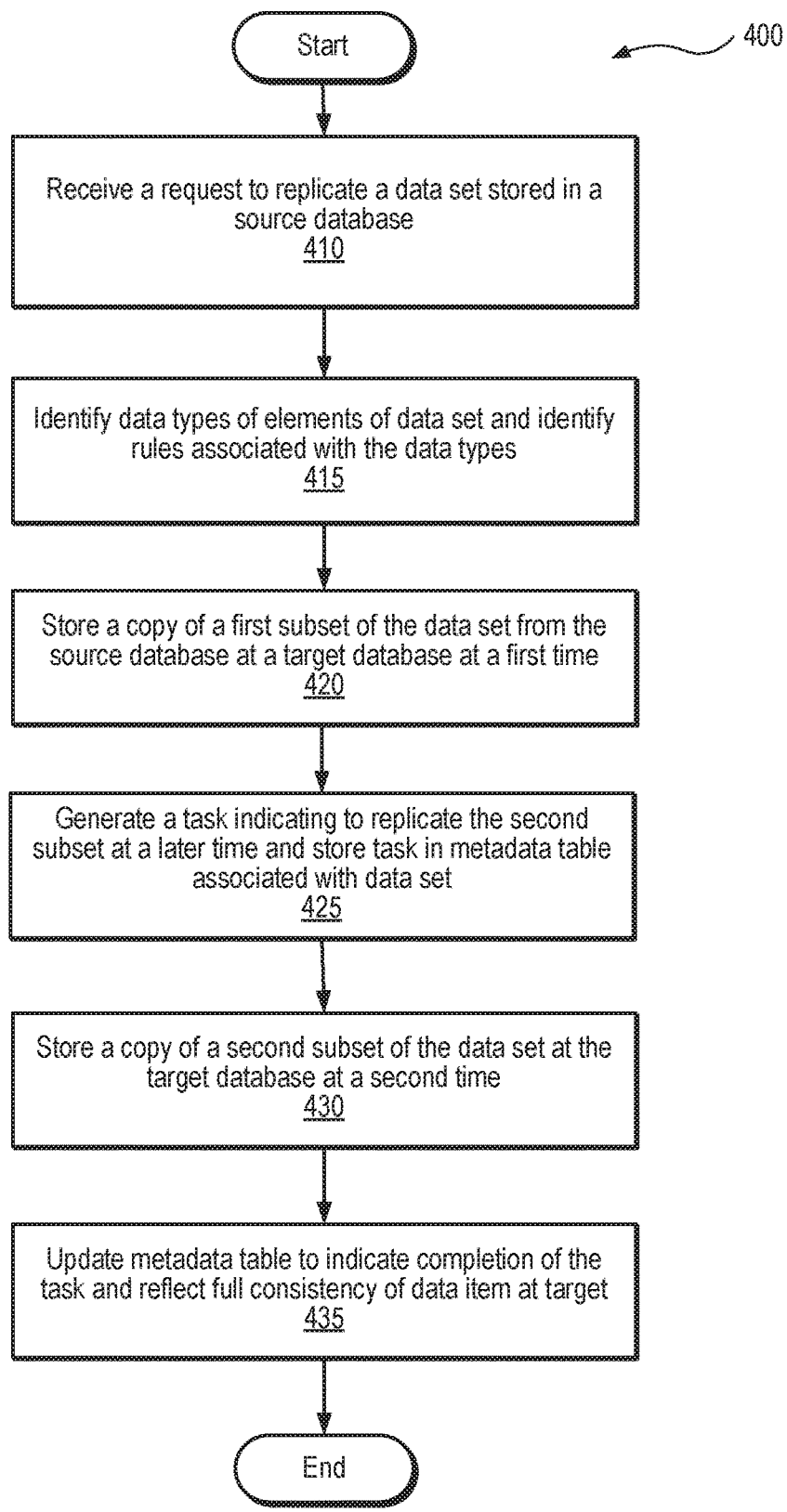
FIG. 4 illustrates a flowchart that provides another example of a process executed by a data replication tool according to another embodiment.

FIG. 4 illustrates a flowchart that provides an example of a process 400 executed by a data replication tool, according to one embodiment. It is understood that the flowchart of FIG. 4 provides an example of the many different types of functional arrangements that may be employed to implement the operation of the data replication tool as described herein. Process 400 may be performed by a processing logic that may comprise hardware (e.g., circuitry, dedicated logic, programmable logic, microcode, etc.), software (e.g., instructions run on a processing device), or a combination thereof. In one embodiment, the data replication tool 118 of FIG. 1 executes the process 400 to replicate data from a source database to one or more target databases at different points in time. In another embodiment, the data replication tool 200 of FIG. 2 executes the process 400. In another embodiment, the DRS 115 of FIG. 1 executes the process 400. Alternatively, one or more components of the server system 110 execute some or all of the process 400.

Referring to FIG. 4, the processing logic begins the process 400 by receiving a request to replicate a data set store in a source database (block 410). The processing logic identifies one or more data types of a plurality of elements in the data set and identifies one or more rules associated with the one or more data types, the one or more rules to specify whether elements of the one or more data types are to be replicated immediately or eventually (block 415). The processing logic stores a copy of a first subset of the data set at a target database at a first time (block 420). The processing logic generates, at the first time, a task indicating to generate a copy of the second element of the data set and send the copy of the second element to the target database at the second time and generates a metadata table associated with the data set, the metadata table comprising an indication of the task (block 425). The processing logic stores a copy of a second subset of the data set at the target database at a second time (block 430). The processing logic updates the metadata table to indicate completion of the task and reflect full consistency of the data item at the target database (block 435), and the process ends.

Figure 5:
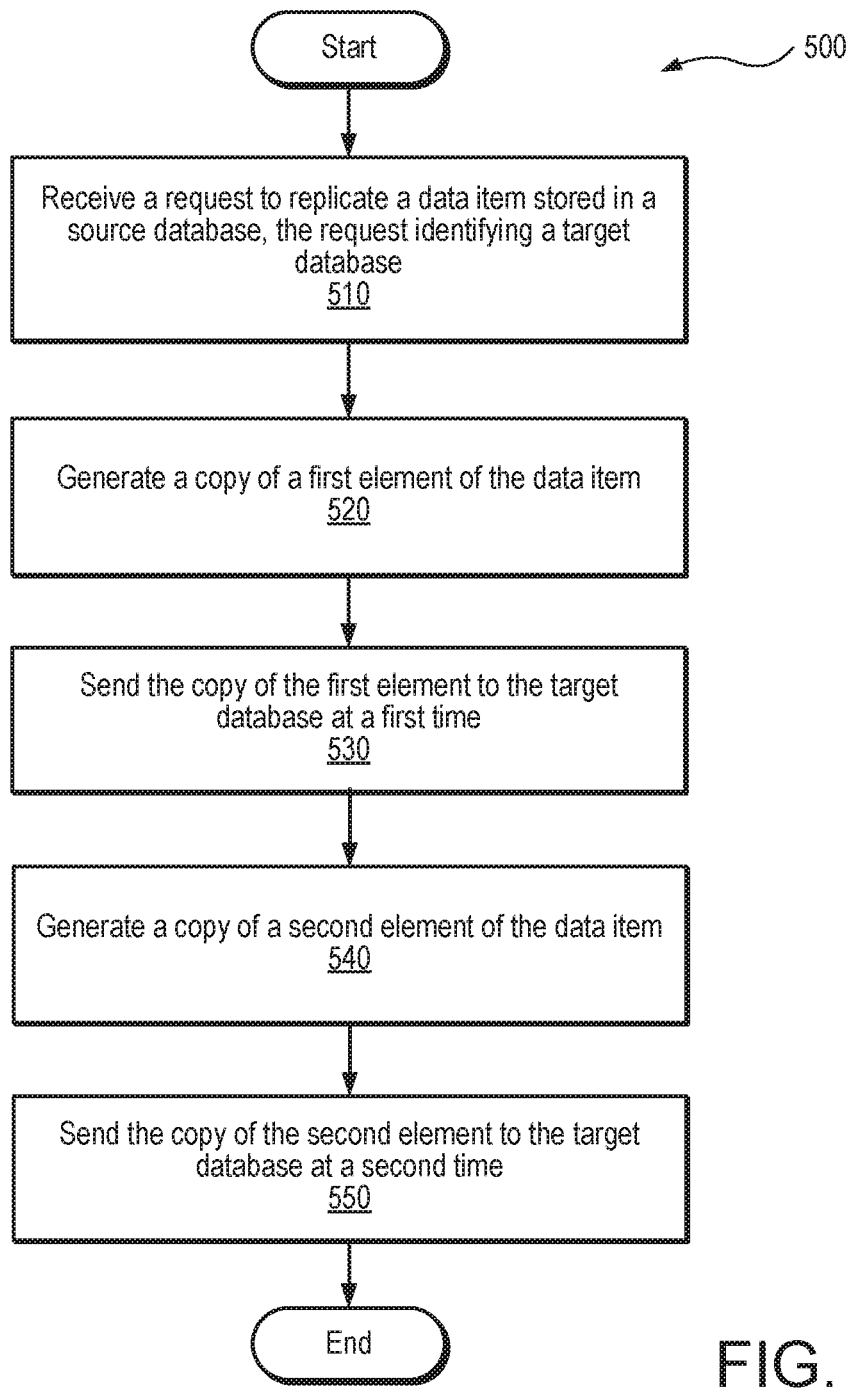
FIG. 5 illustrates a flowchart that provides another example of a process executed by a data replication tool according to another embodiment.

FIG. 5 illustrates a flowchart that provides an example of a process 500 executed by a data replication tool, according to various embodiments. Process 500 may be performed by a processing logic that may comprise hardware (e.g., circuitry, dedicated logic, programmable logic, microcode, etc.), software (e.g., instructions run on a processing device), or a combination thereof. In one embodiment, the data replication tool 118 of FIG. 1 executes the process 500 to replicate data from a source database to one or more target databases at different points in time. In another embodiment, the data replication tool 200 of FIG. 2 executes the process 500. In another embodiment, the DRS 115 of FIG. 1 executes the process 500. Alternatively, one or more components of the server system 110 execute some or all of the process 500.

Referring to FIG. 5, the processing logic begins the process 500 by receiving a request to replicate a data item stored in a source database (block 510). The request may indicate one or more target databases. The data item may include multiple elements. The processing logic generates a copy of a first element of the data item (block 520). The processing logic sends the copy of the first element to the target database at a first time (block 530). The processing logic generates a copy of a second element of the data item (block 540). The processing logic sends the copy of the second element to the target database at a second time (block 550), and the process 500 ends.

In a further embodiment, the processing logic generates and exchanges references (keys) with the target databases. In another embodiment, the processing logic generates a reference table including at least the location of the copy of the first subset of the data set to be stored at the first target database.

Figure 6:
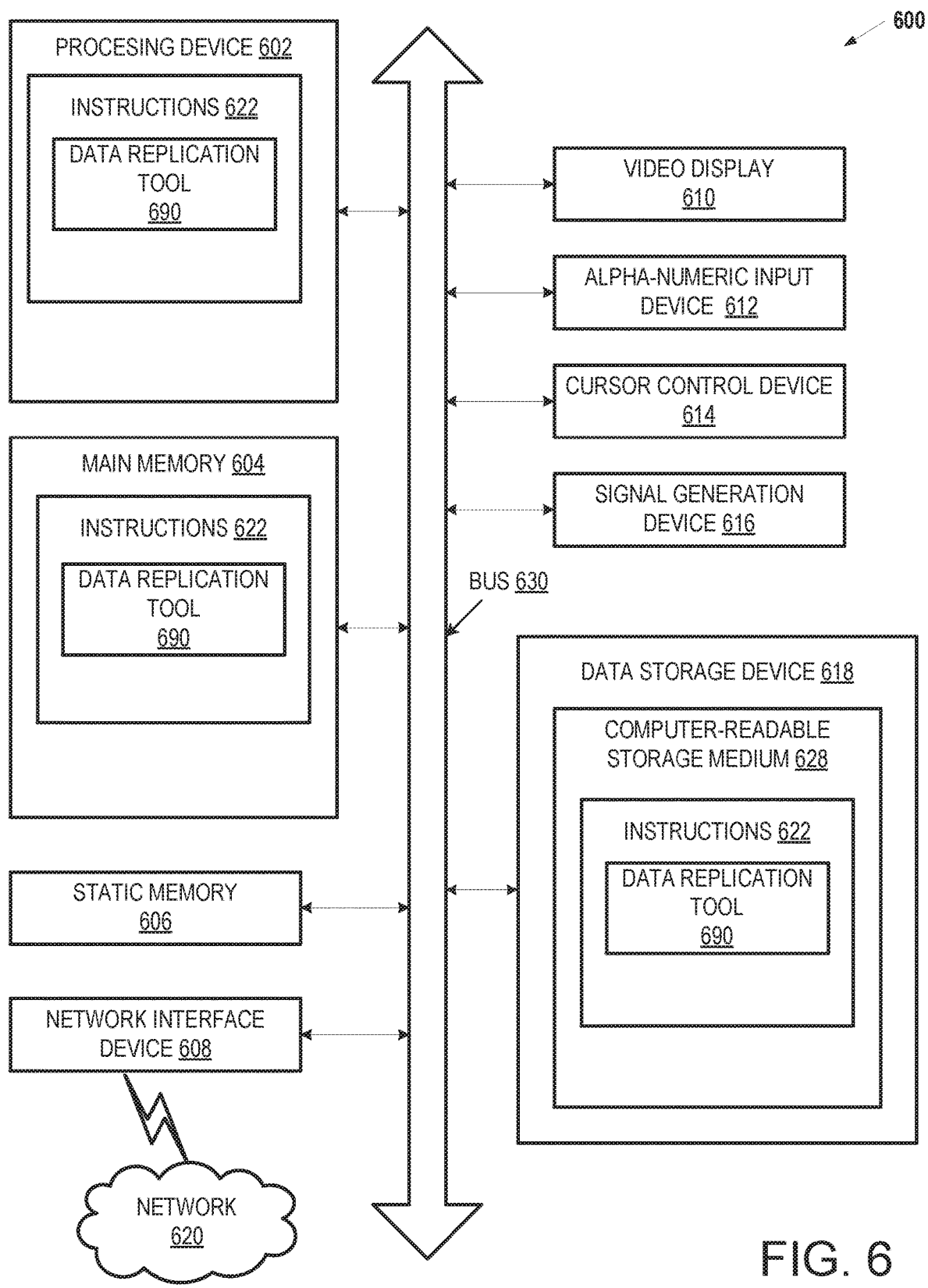
FIG. 6 is a schematic block diagram that provides an example illustration of a computing environment executing instructions relating to data replication according to one embodiment.

FIG. 6 illustrates a diagrammatic representation of a machine in the example form of a computer system 600 including a set of instructions 622 executable by a data replication tool 690 to cause the system to perform any one or more of the methodologies discussed herein. In one embodiment, the data replication tool 690 may include instructions 622 to enable execution of the processes and corresponding components shown and described in connection with FIGS. 1-5.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions 622 (sequential or otherwise) that specify actions to be taken by that machine. Further, while a single machine is illustrated, the term "machine" shall also be taken to include any collection of machines that individually or jointly execute a set (or multiple sets) of instructions 622 to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions 622 for the data replication tool 690 for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 of the data replication tool 690 embodying any one or more of the methodologies or functions described herein. One or more machine-readable mediums having stored thereon one or more instructions, which if performed by one or more processors, cause the one or more processors to at least any of the operations described herein.

The instructions may also reside, completely or at least partially, within the main memory 604 and/or within processing logic of the processing device 602 during execution thereof by the computer system 600, the main memory 604 and the processing device 602 also constituting computer-readable media.

The instructions 622 may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions 622. The term "computer-readable storage medium" or "machine-readable medium having stored thereon one or more instructions," shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "saving", "pausing", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving a request to replicate a data item stored in a source database, the request identifying a target database, the data item comprising a plurality of elements;
generating a copy of a first element of the data item, the first element having a first data type;
sending the copy of the first element to the target database at a first time;
generating, at the first time, a task indicating that a second element of the data item is still to be replicated and storing the task in a queue; and
at a second time, where the second time is determined according to an availability of network resources connecting the source database and the target database, retrieving the task from the queue and performing the task, wherein performing the task comprises:
generating a copy of the second element of the data item, the second element having a second data type; and
sending the copy of the second element to the target database.

2. The method of claim 1, further comprising:
identifying one or more data types of the plurality of elements.

3. The method of claim 2, further comprising:
identifying one or more rules associated with the one or more data types, the one or more rules to specify whether elements of the one or more data types are to be replicated immediately or eventually.

4. The method of claim 1, wherein the second time occurs after the first time.

5. The method of claim 1, further comprising:
generating a metadata table associated with the data item, the metadata table comprising an indication of the task.

6. The method of claim 5, further comprising:
updating the metadata table to indicate completion of the task and reflect full consistency of the data item at the target database.

7. A computing device comprising:
one or more processors; and
memory to store computer-executable instructions that, if executed, cause the one or more processors to:
receive a request to replicate a data set stored in a source database;
store a copy of a first subset of the data set from the source database at a target database at a first time, the first subset of the data set having a first data type;
generate, at the first time, a task indicating that a second subset of the data set from the source database is still to be replicated and storing the task in a queue; and
at a second time, where the second time is determined according to an availability of network resources connecting the source database and the target database, retrieve the task from the queue and perform the task, wherein to perform the task the one or more processors to store a copy of the second subset of the data set from the source database at the target database.

8. The computing device of claim 7, wherein the instructions further cause the one or more processors to:
identify one or more data types present in the data set.

9. The computing device of claim 8, wherein the instructions further cause the one or more processors to:
identify one or more rules associated with the one or more data types, the one or more rules to specify whether elements of the one or more data types are to be replicated immediately or eventually.

10. The computing device of claim 7, wherein the second time occurs after the first time.

11. The computing device of claim 7, wherein the instructions further cause the one or more processors to:
generate a metadata table associated with the data set, the metadata table comprising an indication of the task.

12. The computing device of claim 11, wherein the instructions further cause the one or more processors to:
update the metadata table to indicate completion of the task and reflect full consistency of the data set at the target database.

13. One or more machine-readable mediums having stored thereon one or more instructions, which if performed by one or more processors, cause the one or more processors to at least:
receive a request to replicate a data set stored in a source database;
store a copy of a first subset of the data set from the source database in a first target database at a first time, the first subset of the data set having a first data type;

generate, at the first time, a task indicating that a second subset of the data set from the source database is still to be replicated and storing the task in a queue; and at a second time, where the second time is determined according to an availability of network resources connecting the source database and the target database, retrieve the task from the queue and perform the task, wherein to perform the task the one or more processors to store a copy of the second subset of the data set from the source database to a second target database.

14. The one or more machine-readable mediums of claim 13, wherein the instructions further cause the one or more processors to:

identify one or more data types present in the data set.

15. The one or more machine-readable mediums of claim 14, wherein the instructions further cause the one or more processors to:

identify one or more rules associated with the one or more data types, the one or more rules to specify whether elements of the one or more data types are to be replicated immediately or eventually.

16. The one or more machine-readable mediums of claim 13, wherein the instructions further cause the one or more processors to:

generate a metadata table associated with the data set, the metadata table comprising an indication of the task.

17. The one or more machine-readable mediums of claim 16, wherein the instructions further cause the one or more processors to:

update the metadata table to indicate completion of the task and reflect full consistency of the data set at the target database.

\* \* \* \* \*